April 25, 1950 P. G. REGNA 2,505,205
RESILIENT HITCH FOR PORTABLE MEASURING DEVICES
Filed Jan. 25, 1945
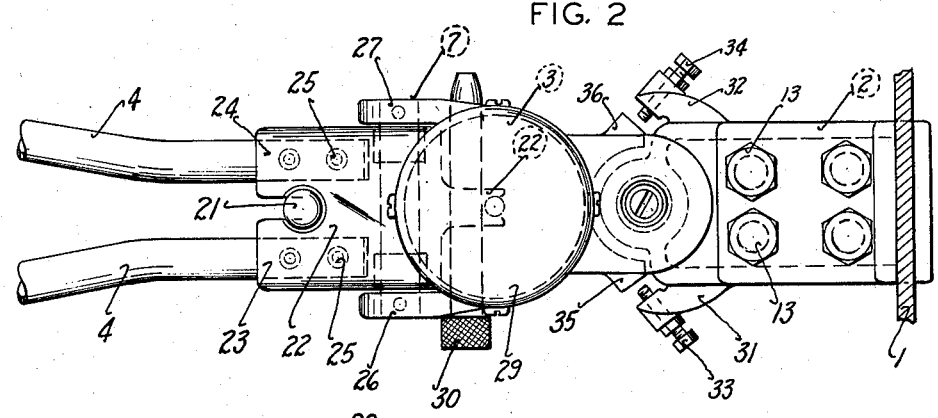
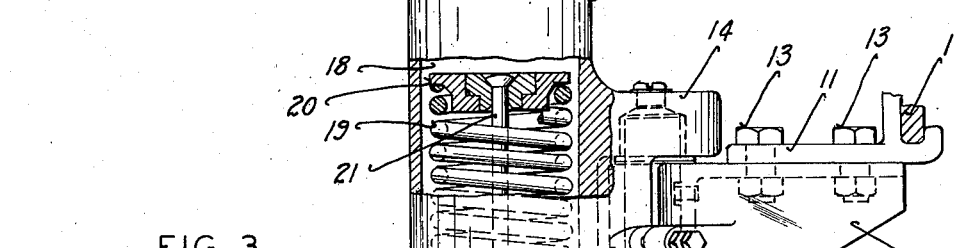
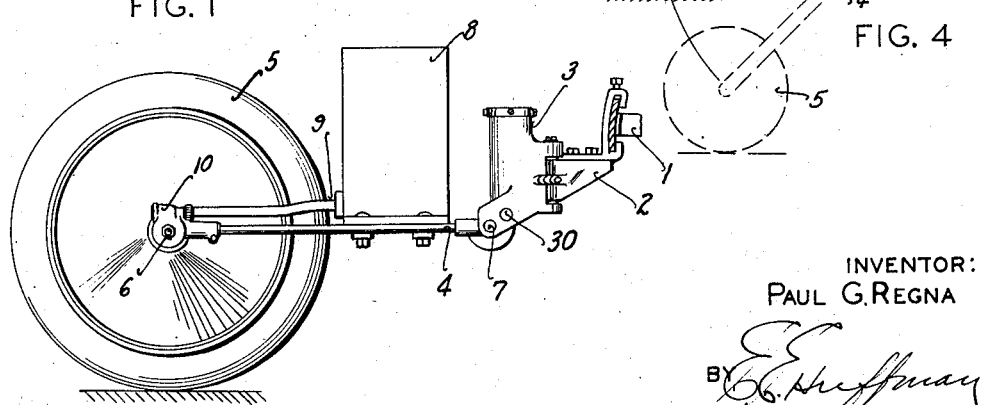
INVENTOR:
PAUL G. REGNA
BY
ATTORNEY Patented Apr. 25, 1950

2,505,205

UNITED STATES PATENT OFFICE 2,505,205

RESILIENT HITCH FOR PORTABLE MEASURING DEVICES

Paul G. Regna, St. Louis, Mo., assignor to Wagner Electric Corporation, St. Louis, Mo., a corporation of Delaware Application January 25 1945, Serial No. 574,543

2 Claims. (Cl. 73—128)

This invention relates to means for maintaining substantially constant contact pressure between the road surface and a wheel of a trailer towed by another vehicle. One particular application for such means is in brake testing apparatus (sometimes designated as a "stopmeter") by means of which the distance traveled by a vehicle after full application of the brakes may be indicated. One such prior stopmeter apparatus is illustrated in Milster et. al. Patent No. 2,279,409.

In stopmeters the trailer wheel which actuates the indicating apparatus is equipped with a pneumatic tire and since the distance traveled, as indicated by instruments driven by this wheel, is a function of the number of rotations of the wheel, a variation during the test of the effective radius of the wheel (distance from wheel center to point of contact with the road surface and which, due to deformation of the tire by pressures effective, will be less than other radii along which no pressure is applied) assumed in fixing the calibrations of the indicating instrument, will result in erroneous indications of the actual distance traveled. The body of a vehicle, whose brakes are being tested, is resiliently mounted and the rear bumper of the vehicle constitutes the most convenient point of attachment of the trailer unit. Consequently, during a test there may be variations in the vertical position of the point of attachment of the trailer wheel frame to the vehicle.

It has heretofore been the practice to apply spring means for producing contact pressure between the trailer wheel and the road surface above that imposed by gravity to assure that the wheel will be maintained in constant engagement with the road surface, but so far as is known, it has not heretofore been proposed to provide spring means having such characteristics and so related to the trailer wheel supporting frame as to maintain constant contact pressure between the trailer wheel and the road and, therefore, a constant effective wheel radius, and it is the object of this invention to produce such an apparatus whereby error in the instrument indication of the actual distance traversed may be avoided notwithstanding variation in the vertical position of the point of attachment of the trailer frame to the vehicle whose brakes are being tested or variation in the vertical position of the wheel resulting from irregularities in the road surface.

In the drawings:

Figure 1 shows a vertical elevational view of the stopmeter;

Figure 2 shows an enlarged plan view of a section of the trailer hitch;

Figure 3 shows an enlarged vertical elevational view, partly in section, to show details of construction of the trailer hitch; and Figure 4 is a schematic view of a modified form of the invention.

The achievement of the above object is obtained in the device set forth in the accompanying drawings in which 1 is a portion of the rear bumper of a towing vehicle to which the trailer unit is attached. This hitch may also be secured to other parts of the towing vehicle. Numeral 2 represents generally the trailer hitch having a housing 3 pivotally secured thereto and a frame 4 in which wheel 5 is rotatably mounted on an axle 6 which is pivoted to the housing 3 by means of a spindle or pin 7 to allow the frame 4 and associated wheel 5 to move vertically with respect to housing 3 and bumper 1 about 7 as an axle. A housing 8 is shown conveniently mounted on frame 4 and a drive shaft 9 connected to power intake on housing 8 transmits motion from the wheel through a speed changer 10 associated with the wheel 5 and axle 6 to thereby transmit rotative motion from the wheel of the mechanism contained in housing 8 and record the travel of wheel 5. The mechanism contained in housing 8 may be of the type shown in Milster copending applications Serial Nos. 568,532, now Patent No. 2,472,541, and 568,533, now Patent No. 2,486,965, filed December 16, 1944. The operation of the mechanism is fully set forth in the several applications and, therefore, need not be repeated herein.

The trailer hitch comprises an appropriate bracket element 11 that is attachable to the bumper 1 or any other part of the towing vehicle and a fixture 12 is secured thereto by means of a plurality of bolts 13. The housing 3 has a pair of lugs 14 thereon that are axially disposed and are bored to receive a pin 16 suitably secured to fixture 12 and provided in the lugs or brackets 14. The pin 16 is secured to the fixture 12 by screws 17.

Housing 3 is bored as at 18 to receive a spring 19 having a fixture 20 fitting into the end of the spring. The fixture 20 is suitably bored and countersunk to receive a flexible bolt or cable 21 that extends concentrically of the compression spring 19 down through the lower end of housing 3 and is there wrapped about a sheave 22. Sheave 22 is flared and extended, as indicated, between parts 23 and 24 and the cable 21 is received in an appropriate slot and socket as more particularly shown in Figure 2. The flared extensions in the sheave are suitably bored to receive tubular frame elements 4 and secured therein by a plurality of retaining members 25. The pin 7 is received in flanges 26 and 27 integrally associated with said housing and pin 7 is received therein and held in position by an appropriate retaining member 28. A removable closure element 29 is provided for the housing 3.

During periods of rest or removal of the trailer unit from the towing vehicle, a knurled pin 30, as shown in Figure 2, is provided to lock the spring in a fixed position in order to prevent it from being effective.

Stop elements 31 and 32 having lock screws 33 and 34, respectively, threaded into each are intended to engage with abutments 35 and 36 to limit the side sway of the trailer unit about 15 as an axis. Screws 33 and 34 are employable to vary the amount of side sway that would be permitted in the trailer unit such as occurs during the backing of the vehicle. The stops are preferably set to limit the side sway to seven and one-half degrees from the center or a total swing of fifteen degrees as a maximum and screws 33 and 34 may limit the extent of side sway to any amount desirable as may be determined by the operator.

The modified structure shown in Figure 4 illustrates the frame 4 and wheel 5 in which a lever 37 replaces the sheave structure and the housing 3 is schematically illustrated with the spring 19 therein. The connecting means in the form of a rigid bolt 38 connects the eye of the lever with element 20 in order to apply the action of spring 19 to the trailer wheel 5. The dotted line illustration of 4 and 5 shows the maximum vertical movement, which is approximately forty-five degrees, that the arm 4 and wheel 5 will pivot without materially changing the pressure between wheel 5 and the surface traversed.

The device maintains a substantially constant pressure between wheel 5 and the surface traversed when the frame 4 pivots about spindle 7 regardless of surface undulations and the vertical positioning or movement of the bumper 1 of the towing vehicle relative to said surface. The foregoing result is obtained because the effective length of the moment arm about which wheel 5 acts varies as the wheel moves vertically relative to spindle 7. This change in effective length of the wheel moment arm is accompanied by corresponding changes in the force exerted by the spring 19 as it changes length. The rate of build-up of resistance of the spring and the point of application of the spring to the frame are each so chosen as to cause the wheel to engage the road at substantially the same pressure under all operative variations in the vertical position of the spindle 7. The effective length of the moment arm on which spring 19 acts (see Figure 3) remains uniform for all variations in the vertical position of wheel 5 relative to spindle 7 and because the effective moment arm about which wheel 5 swings, changes in length and the force exerted by spring 19 correspondingly changes, the pressure exerted by wheel 5 on the surface traversed, therefore, remains substantially constant. The device shown in Figure 4 operates in a similar manner. In the form shown in this figure the effective length of the spring arm will vary slightly under the operative motions of frame 4 on spindle 7 but experience has shown that this variation is not sufficient to impair the accuracy of the measuring device.

From the foregoing it is evident that means has been provided that maintains a substantially constant contact pressure between wheel 5 and the surface traversed and that produces far more accurate results than when adjustments are made manually as in presently known devices.

Having fully described my invention, that which I claim as novel and desire to protect by Letters Patent of the United States is:

1. In a mechanism for association with a vehicle for driving an instrument for recording distance, means securable to a vehicle to be tested; a sheave pivotally mounted in said means; a frame supporting a road engaging wheel for driving the instrument and secured to said sheave; a spring; and means connected to said spring and operatively associated with said sheave to enable said spring to urge said wheel into engagement with the road surface, said sheave constituting a lever arm of uniform length on which said spring acts under all operative variations in the rotative position of said frame about the pivot point, the distance of the wheel on said frame from the pivot point and the rate of build-up of spring resistance being so chosen as to cause the drive wheel to engage the road at substantially the same pressure under all operative variations in the vertical position of said sheave.

2. A resilient hitch for a portable measuring device of the type that measures the distance of travel of a vehicle following brake application, comprising a frame for attachment to the body of a vehicle and movable therewith, a housing pivotally connected to said frame on a vertical axis, stop means extending from opposite sides of said frame to limit the lateral displacement of said housing relative to the line of travel of the vehicle, resilient means carried by the housing, a wheel frame carrying a road engaging wheel for actuating the measuring device, said frame being pivotally connected to said housing on a horizontal axis beneath said resilient means and capable of vertical displacement relative to the vehicle, a uniform length moment arm comprising a sheave connected to said frame, and means extending between said resilient means and said moment arm to apply the force of the resilient means to the wheel frame and thence to the wheel to apply uniform pressure of the wheel to the road surface over which the vehicle moves regardless of the vertical displacement of the wheel frame relative to the vehicle or the vertical displacement of the vehicle frame relative to its supporting wheels.

PAUL G. REGNA.

REFERENCES CITED

The following references are of record in the file of this patent:

UNITED STATES PATENTS

| Number | Name | Date |
|---|---|---|
| 1,950,583 | Watkins | Mar. 13, 1934 |
| 2,159,885 | Cullin | May 23, 1939 |
| 2,227,875 | Boden | Jan. 7, 1941 |
| 2,279,409 | Milster et al. | Apr. 14, 1942 |
| 2,282,506 | Wachter | May 12, 1942 |
| 2,347,106 | Howell | Apr. 18, 1944 |
| 2,370,141 | Brunner | Feb. 27, 1945 |